US006510985B1

(12) United States Patent
Clark et al.

(10) Patent No.: US 6,510,985 B1
(45) Date of Patent: Jan. 28, 2003

(54) AUTOMATIC TELLER MACHINES

(75) Inventors: Barrie Clark; Robert D. Andrew, both of Dundee (GB)

(73) Assignee: NCR Corporation, Dayton, OH (US)

( * ) Notice: Subject to any disclaimer, the term of this patent is extended or adjusted under 35 U.S.C. 154(b) by 574 days.

(21) Appl. No.: 08/886,483

(22) Filed: Jul. 1, 1997

(30) Foreign Application Priority Data

Nov. 29, 1996 (GB) ............................................ 9624820

(51) Int. Cl.[7] ................................................ G06F 17/60

(52) U.S. Cl. ........................... 235/379; 235/380; 402/8; 402/12

(58) Field of Search ................................ 235/379, 380, 235/381, 382, 385; 902/8, 9, 12, 14; 705/40, 41, 43

(56) References Cited

U.S. PATENT DOCUMENTS 4,577,763 A * 3/1986 Placke et al. ............... 235/379
4,795,889 A 1/1989 Matuura et al.
4,980,543 A * 12/1990 Hara et al. .................. 235/379
5,021,639 A * 6/1991 Hara et al. .................. 235/379

FOREIGN PATENT DOCUMENTS

EP 0 644 511 3/1995

OTHER PUBLICATIONS

"Automatic Transaction Facility," IBM TECHNICAL DISCLOSURE BULLETIN, vol. 28, No. 3, Aug. 1985, p. 1032 XP002058709.

* cited by examiner

*Primary Examiner*—Michael G. Lee
*Assistant Examiner*—Daniel St. Cyr
(74) *Attorney, Agent, or Firm*—Michael Chan

(57) ABSTRACT

An automatic teller machine has not only a main store comprising a number of cassettes (38, 40, 42, 44, 46 and 48) holding stacks of banknotes but also faster operating auxiliary stores (4 and 5) which hold limited numbers of the most popular denominations of banknote. A request for cash is met, if possible, from the auxiliary stores (4 and 5). This enables the machine to provide a service at a faster rate than the rate of dispensing from of the main store. The auxiliary stores are replenished from the main store, preferably at times during which the machine is not in the process of dispensing notes to a customer.

12 Claims, 2 Drawing Sheets

AUTOMATIC TELLER MACHINES

BACKGROUND OF THE INVENTION

This invention relates to automatic teller machines (ATMs).

In conventional ATMs stacks of banknotes are stored in cassettes from which they are extracted on receipt of a valid request from a customer. Known mechanisms for extracting notes from a cassette and delivering them to a collection point include vacuum-operated moveable suction pads and a conveyor belt. The notes need to be lifted one by one from the top of the stack and a mechanical drive moves the suction pads from a cassette to the conveyor belt. Inevitably there must be a time delay between the issue by a customer of a valid order for cash and the delivery of the banknotes comprising the request to the collection point. In view of the mechanical complexity of removing notes from a cassette and their subsequent transport the time delay will be sufficient to be noticeable to the customer. Such time delay will be a limiting factor in the speed of functioning of an ATM and hence in the maximum number of transactions that can be handled in a given time by an ATM. The wide acceptances of ATMs throughout the world make it desirable to minimize individual transaction times and increase the number of transactions that an ATM can handle in a given time and thus improve the return on their capital cost.

SUMMARY OF THE INVENTION

It is an object of the invention to decrease the time required by an ATM to handle a transaction.

According to the invention there is provided an automatic teller machine including a main store for storing at least one stack of banknotes, transport means for extracting notes from the main store and transporting them to a predetermined destination, and an external collection point for banknotes characterized in that at least one auxiliary ,tore for storing banknotes is provided and the transport means is arranged to transport notes from the main store to the auxiliary store and from the auxiliary store to the collection point.

Preferably the auxiliary store dispenses banknotes at a faster rate than the main store.

In carrying out the invention the auxiliary store may be arranged to dispense notes when they are requested in preference to the main store.

In embodiments of the invention a plurality of auxiliary stores may be provided holding banknotes of different denominations to each other. The main store may comprise a plurality of storage cassettes each storing a stack of banknotes. Different cassettes may;store notes of the same or different denominations.

BRIEF DESCRIPTION OF THE DRAWINGS

In order that the invention may be more fully understood reference will now be made to the accompanying drawings in which.

DETAILED DESCRIPTION

Figure 1:
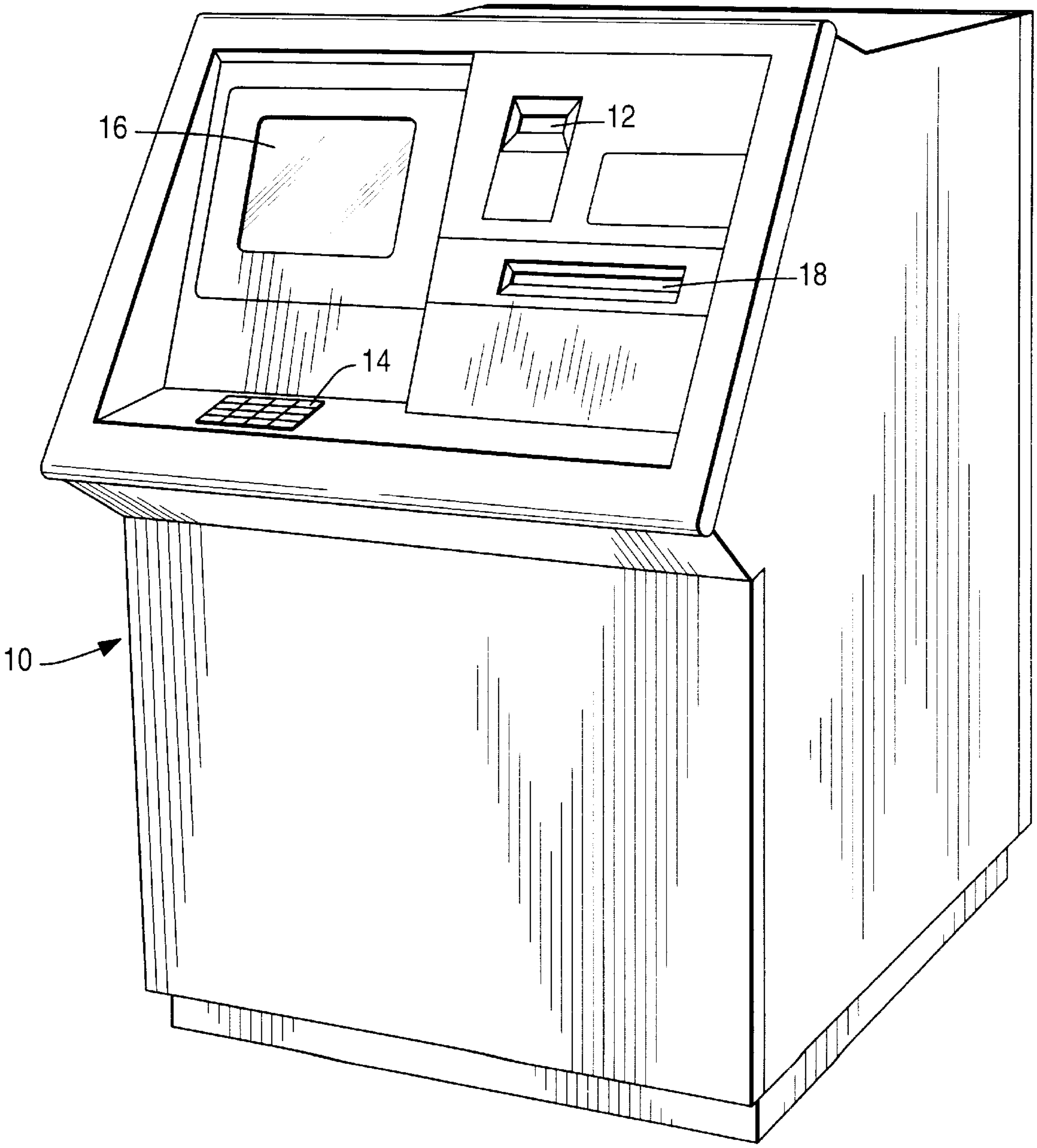
FIG. 1 is an external perspective view of an automatic teller machine.

Referring now to FIG. 1 the front of an ATM is shown as a console 10 which is made available for use by customers.

Console 10 has a keyboard 14, a display screen 16, a slot 12 for the insertion of a suitably encoded card, usually personal to a bank account holder r, and a collection point 18 from which the customer is able to remove banknotes when they are delivered there. To the customer the operation of the ATM is designed to be as simple and foolproof as possible. He inserts his card into slot 12 for the information encoded on it to be read. Instructions are then displayed on screen 16. The customer is requested to key in a personal identification number (PIN) on the keyboard. This number is verified, usually at a central location remote from console 10, and if determined to be correct against information read from the inserted card the customer is then offered on screen 16 a menu of facilities available to him at console 10. These will include a cash withdrawal facility. The sum required is entered by the customer at the keyboard or at additional keys provided at the side of the screen. From this moment on it is desirable that the mechanism behind the console operates to deliver the requested order as quickly as possible. Means embodying the invention for achieving this is shown in FIG. 2.

Figure 2:
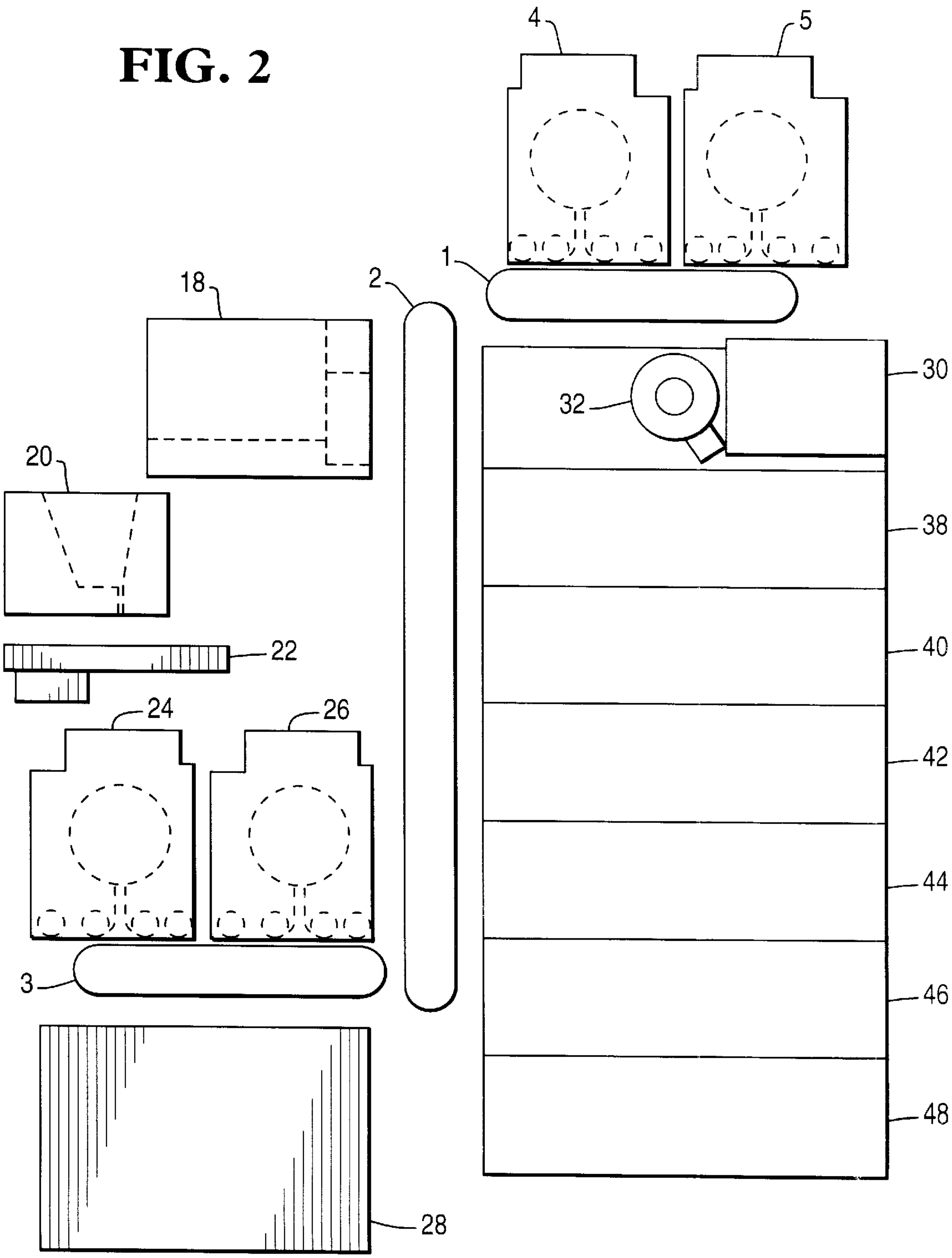
FIG. 2 is a diagrammatic view of the main operating parts of an automatic teller machine embodying the invention.

Referring now to FIG. 2 there is shown therein a mechanism for delivering banknotes speedily to collection point 18. Stacks of banknotes are held in cassettes 38, 40, 42, 44, 46 and 48. The different cassettes may hold notes of the same or different denominations as considered appropriate, in anticipation of demand. Known picker devices (not Shown) are provided for extracting notes from the cassettes. These devices may include vacuum-operated moveable suction pads, driven by a motor 32. A transport mechanism comprising a linked set of conveyer belts having three linked sections 1, 2 and 3 transports notes from the picker devices to their destination. In a conventional ATM this destination will be collection point 18. However the mechanical complexity of removing notes from the cassettes and transferring them to the transport mechanism is a limiting factor in the speed of transfer and introduces a delay which is noticeable to the customer. In order to reduce the delay two additional auxiliary stores 4 and 5 are provided.

Stores 4 and 5 may take a variety of physical forms and are chosen to dispense banknotes to a conveyor belt faster than the picker devices associated with the cassettes. Examples are storage stacks, a circulating storage device such as a belt or drum, or a device employing one or more spiral belts. Any convenient number of such auxiliary stores can be provided. Each will be designated to hold a particular denomination of banknote likely to be in popular demand. Two such auxiliary stores 4 and 5 are most likely, and in the United Kingdom these may conveniently hold £10notes and £20 notes respectively, which are the ones in most common demand. However, a greater or lesser number of auxiliary stores may equally well be provided. Auxiliary stores 4 and 5 are preferably chosen to have less inertia than the main store so that they dispense banknotes at a faster rate than the main store, so reducing overall transaction times. The auxiliary stores can be of the kind that dispense notes either on a "last in first out" (LIFO) or on a "first in first out" (FIFO) basis.

A feature of the ATM shown in FIG. 2 is the three linked conveyer belt sections 1, 2 and 3. Notes extracted from the cassettes are loaded onto section 2. They can be transported from section 2 either to collection point 18 or else to the appropriate one of auxiliary stores 4 and 5. Notes can also be withdrawn from either one of stores 4 or 5 and deposited onto section 1 of the conveyer belt. From section 1 notes can be transported to collection point 18.

In operation, when a customer has validly entered a specific order the ATM is programmed to initially attempt to fulfill that order from either or both of auxiliary stores 4 and 5. If at least some of the required notes are available in these stores they are extracted and placed on section 1 of the conveyer belt for transport to collection point 18. This transfer operation is noticeably faster than the equivalent transfer operation from the cassettes to collection point 18. If it is not possible to complete the order from stores 4 or 5 but notes for the order are available from the cassettes in the main store then the balance of the order is obtained by extraction from the cassettes, in which case the notes deposited on section 2 of the conveyor belt are transported to collection point 18.

A desirable feature of the machine illustrated in the figures is that the auxiliary stores 4 and 5 are replenished as much as possible and the replenishing operation functions independently of customer requests. In the replenishing operation appropriate notes are extracted from the cassettes whenever there is a vacancy in any auxiliary store 4 or 5. The notes are deposited onto section 2 of the conveyor belt and carried to section 1 and thence to the appropriate auxiliary store 4 or 5 designated for those notes. This replenishing operation ensures that maximum use is made of the faster auxiliary stores.

In addition to the cash dispensing arrangements described above FIG. 2 also shows a receiving arrangement by means of which banknotes and cheques may be deposited by a customer. Items for deposit are put into input hopper 20. They are transferred from there to a sorting and imaging device 22 where the banknotes and cheques are separated, with banknotes going to a banknote store 24 and cheques going to a cheque store 26. The third section 3 of the conveyor belt operates to transfer notes, if they are of appropriate denominations as determined by device 22, to auxiliary stores 4 and 5 when vacancies occur in those stores. It may be preferable to carry out such a transfer in preference to the removal of notes from the main store. A further imaging device 28 is provided for a more detailed examination of cheques held in cheque store 26.

A further store 30 is also provided, which may be a multi-compartment bin supplied from section 1 of the conveyor belt. One use of store 30 is as a purge bin for mispicked notes.

What is claimed is:

1. An automatic teller machine (ATM) for allowing an ATM customer to withdraw banknotes during a withdrawal transaction, the ATM comprising:

an auxiliary storage unit for storing banknotes to be transported from the auxiliary storage unit to an external collection point via a first transport path to dispense banknotes to an ATM customer during a withdrawal transaction;

a main storage unit for storing banknotes to be transported from the main storage unit to the external collection point via a second transport path which is different from the first transport path to dispense banknotes to an ATM customer during a withdrawal transaction and transported from the main storage unit to the auxiliary storage unit via a third transport paths which is different from the first and second transport paths to replenish the auxiliary storage unit with banknotes during a replenishing operation; and transport means for (i) transporting banknotes from either the auxiliary storage unit to the external collection point via the first transport path or the main storage unit to the external collection point via the second transport path to dispense banknotes to an ATM customer during a withdrawal transaction, and (ii) transporting banknotes from the main storage unit to the auxiliary storage unit via the third transport path to replenish the auxiliary storage unit with banknotes during a replenishing operation.

2. An ATM according claim 1, wherein the main storage unit comprises a plurality of cassettes each storing a stack of banknotes.

3. An ATM according to claim 2, wherein the auxiliary storage unit comprises a circulating storage device including a belt.

4. An ATM according to claim 2, wherein the auxiliary storage unit comprises a circulating storage device including a drum.

5. An ATM according to claim 1, wherein the auxiliary storage unit includes means for enabling banknotes to be transported at a faster rate from the auxiliary storage unit to the external collection point via the first transport path than from the main storage unit to the external collection point via the second transport path.

6. An ATM according to claim 5, wherein banknotes stored in the auxiliary storage unit are preferred over banknotes stored in the main storage unit when banknotes are transported to the external collection point to dispense banknotes to an ATM customer.

7. An automatic teller machine (ATM) for allowing an ATM customer to withdraw banknotes during a withdrawal transaction, the ATM comprising:

gin auxiliary storage unit for storing banknotes to be transported from the auxiliary storage unit to an external collection point to dispense banknotes to an ATM customer during a withdrawal transaction;

a main storage unit for storing banknotes to be transported from the main storage unit to the external collection point to dispense banknotes to an ATM customer during a withdrawal transaction and transported from the main storage unit to the auxiliary storage unit to replenish the auxiliary storage unit with banknotes during a replenishing operation; and transport means for (i) transporting banknotes from either only the auxiliary storage unit or only the main storage unit to the external collection point to dispense banknotes to an ATM customer during a withdrawal transaction, and (ii) transporting banknotes from the main storage unit to the auxiliary storage unit to replenish the auxiliary storage unit with banknotes during a replenishing operation.

8. An ATM according claim 7, wherein the main storage unit comprises a plurality of cassettes each storing a stack of banknotes.

9. An ATM according to claim 8, wherein the auxiliary storage unit comprises a circulating storage device including a belt.

10. An ATM according to claim 8, wherein the auxiliary storage unit comprises a circulating storage device including a drum.

11. An ATM according to claim 7, wherein the auxiliary storage unit includes means for enabling banknotes to be transported at a faster rate from the auxiliary storage unit to the external collection point than from the main storage unit to the external collection point.

12. An ATM according to claim 11, wherein banknotes stored in the auxiliary storage unit are preferred over banknotes stored in the main storage unit when banknotes are transported to the external collection point to dispense banknotes to ATM customer.

* * * * *

UNITED STATES PATENT AND TRADEMARK OFFICE

CERTIFICATE OF CORRECTION

PATENT NO. : 6,510,985 B1 
DATED : January 28, 2003
INVENTOR(S) : Barrie Clark and Robert D. Andrew It is certified that error appears in the above-identified patent and that said Letters Patent is hereby corrected as shown below:

<u>Column 3,</u>
Line 58, after “transport”, “paths” should be -- path --.

<u>Column 4,</u>
Line 29, “gin” before “auxillary” should be -- an --.

Signed and Sealed this

Twenty-second Day of April, 2003

JAMES E. ROGAN
*Director of the United States Patent and Trademark Office*